United States Patent [19]

Lees et al.

[11] Patent Number: 4,695,959
[45] Date of Patent: Sep. 22, 1987

[54] PASSIVE RANGE MEASUREMENT APPARATUS AND METHOD

[75] Inventors: David E. B. Lees, Lexington; John Merchant, Needham, both of Mass.

[73] Assignee: Honeywell Inc., Minneapolis, Minn.

[21] Appl. No.: 902,262

[22] Filed: Aug. 29, 1986

Related U.S. Application Data

[63] Continuation of Ser. No. 597,621, Apr. 6, 1984, abandoned.

[51] Int. Cl.⁴ .......................... G01C 3/00; G01S 13/89
[52] U.S. Cl. .......................................... 364/458; 356/3
[58] Field of Search ....................... 364/458, 453, 562; 342/180, 191, 197, 135, 136, 138; 356/3; 340/729

[56] References Cited

U.S. PATENT DOCUMENTS

| | | | |
|---|---|---|---|
| 3,546,375 | 12/1970 | Vitt | 343/7.9 |
| 3,961,851 | 6/1976 | Gerharz | 356/12 |
| 4,032,912 | 6/1977 | Wood | 340/729 |
| 4,122,521 | 10/1978 | Rick et al. | 364/456 |
| 4,359,732 | 11/1982 | Martin | 343/5 CM |
| 4,504,915 | 3/1985 | Hofmann | 356/2 |
| 4,635,203 | 1/1987 | Merchant | 364/458 |

OTHER PUBLICATIONS

Merchant, Optical Engineering, "Exact Area Registration of Different Views of a Common Scene", pp. 424-436, vol. 20, No. 3.

*Primary Examiner*—Errol A. Krass
*Assistant Examiner*—Thomas G. Black
*Attorney, Agent, or Firm*—John S. Solakian; George A. Leone, Sr.

[57] ABSTRACT

A passive range measurement device and method are described which device includes a camera, onboard motion sensors, image digitizers and memories and a digital processor. The device creates a digitized image stream from successive images taken by the camera. The digital processor operates on the image stream in conjunction with information obtained from the onboard motion sensors to determine the location of a median plane through the scene, and the position of terrain detail located on that plane. By evaluating in like fashion hypothetical slices through the scene parallel to the median plane, a topographic range map of the scene may be created. This map is referenced to the position of the camera and platform, and may, therefore, be used to provide a terrain following capability.

13 Claims, 15 Drawing Figures

PASSIVE RANGE MEASUREMENT APPARATUS AND METHOD

BACKGROUND OF THE INVENTION

This is a continuation of application Ser. No. 597,621 filed 4/6/84, now abandoned.

The present invention relates to range finding devices and methods, and more particularly to those devices and methods which use successive two-dimensional images of a scene to derive range or terrain structure information.

In the past, low flying aircraft or remotely piloted vehicles have utilized an active imaging sensor, for example, a laser or radar scanning device in order to derive range or terrain structure information. Typically, these terrain sensing devices scan the scene with an appropriate energy source, creating a range-image map of the upcoming terrain scene in which the intensity of each sensed pixel is proportional to the range from the active sensor to the corresponding portion of the scene.

These devices have several disadvantages. First, devices using an active imaging sensor will generally be more complex than those using a passive sensor and will, therefore, be more expensive. Second, the addition of a power supply for an active sensor increases the device weight and volume, which is generally undesirable in aircraft applications. Third, when such devices are used in low flying reconnaissance vehicles, the illuminating source used with the sensor may be seen from the ground, thus negating any stealth benefit gained by flying at a low altitude.

It is accordingly a primary object of the present invention to provide a range measurement or terrain mapping device which does not require an active sensor, and which is capable of deriving range information in real time as required by low flying aircraft or terrain following vehicles.

SUMMARY OF THE INVENTION

The above and other objects of the present invention are derived by providing a passive imaging sensor which creates stereo image pairs of the scene of interest, coupled to a digital processor which calculates in three dimensional space the position of the scene detail corresponding to each pixel in the images.

The device operates by calculation of warping or transformation coefficients and equations which will transform the two dimensional image of one view of a scene to match a second view of the same scene taken from a different sensor position. The transformation coefficients are analytically related to the camera-scene orientation and range. Thus, given the transformation coefficients, the orientation of a scene and range to any point in the scene may be computed.

In the approach used, called "range slicing", the global transformation is derived, open-loop, from onboard measurements of the camera displacement and rotation between the two images. It is assumed that any misregistration between images remaining after the global transformation is the result of height variation from the median plane discernible through parallax differences. A series of planes parallel to a preselected reference plane ("range slices") are selected, and the trasformation algorithm is applied to the image for each plane in turn. Where the vector field is zero, the terrain lies on the "slices". Thus, the portions of the scene lying in each plane may be determined. The continuous height distribution of the scene may be approximated by determining which portions of the scene lie in each of the parallel planes. The height error is, therefore, approximately plus or minus half the distance between the selected parallel planes.

This approach has the advantage that it is simpler to implement in hardware than other passive methods and operates easily at video frame rate execution speeds. Another advantage of this approach is that it is amenable to parallel processing since the transformation algorithm may be carried out independently for each range slice, if required.

Because the processing action of the present invention is based on registration of pixels, rather than on registration feature in the images, the accuracy of the mapper of the present invention is substantially independent of scene content type.

BRIEF DESCRIPTION OF THE DRAWINGS

The above and other objects of the present invention are achieved in the illustrative embodiments as described with respect to the Figures in which.

DETAILED DESCRIPTION OF THE PREFERRED EMBODIMENT(S)

A. Introduction

Figure 1:
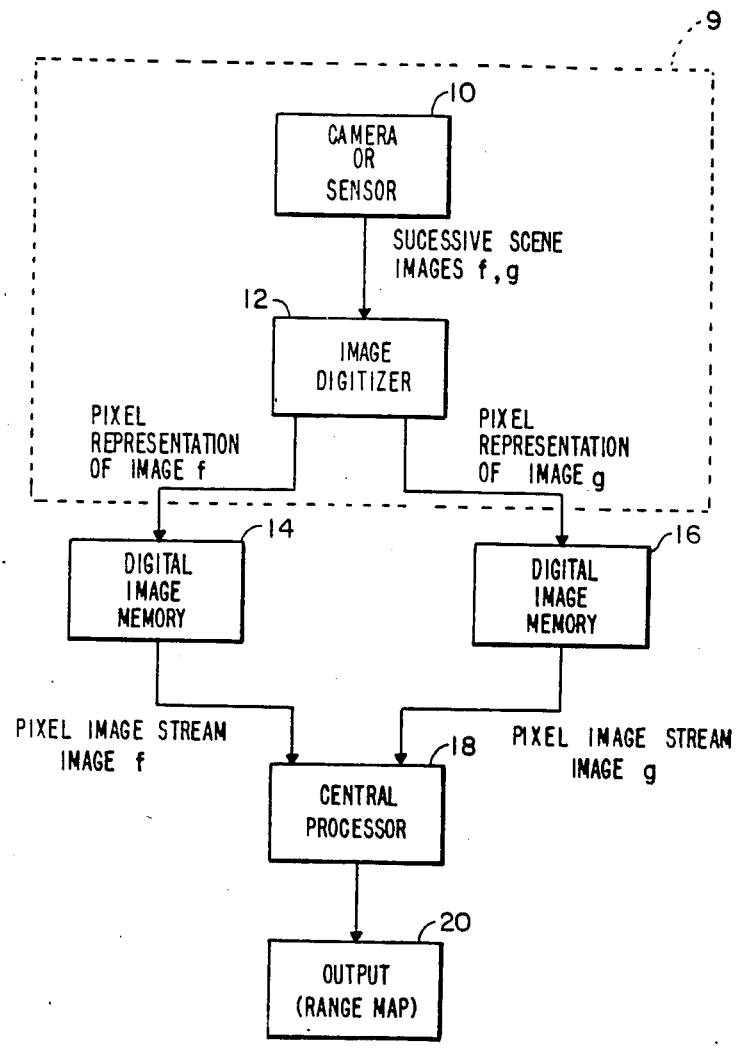
FIG. 1 shows a block diagram of the device and method of the present invention.

Referring to FIG. 1, the device of the present invention includes a camera, sensor, or other two-dimensional image creating device 10, a digitizer 12 which transforms the image created by camera 10 into pixel arrays where intensity of each pixel is proportional to the intensity of the corresponding scene detail, digital image memories 14 and 16 which store the desired digitized images, and central processor 18 which operates on the digitized images to derive the desired information (terrain map, range information, etc.). It is understood that memories 14 and 16 may be a single memory.

Figure 3A:
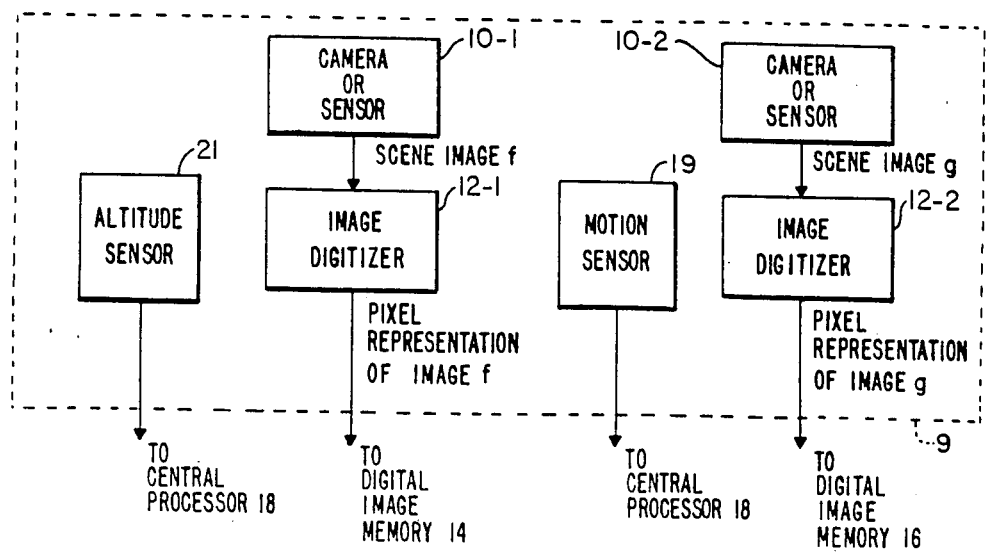
FIGS. 3A and 3B show alternate input streams for the device and method of the present invention.
Figure 3B:
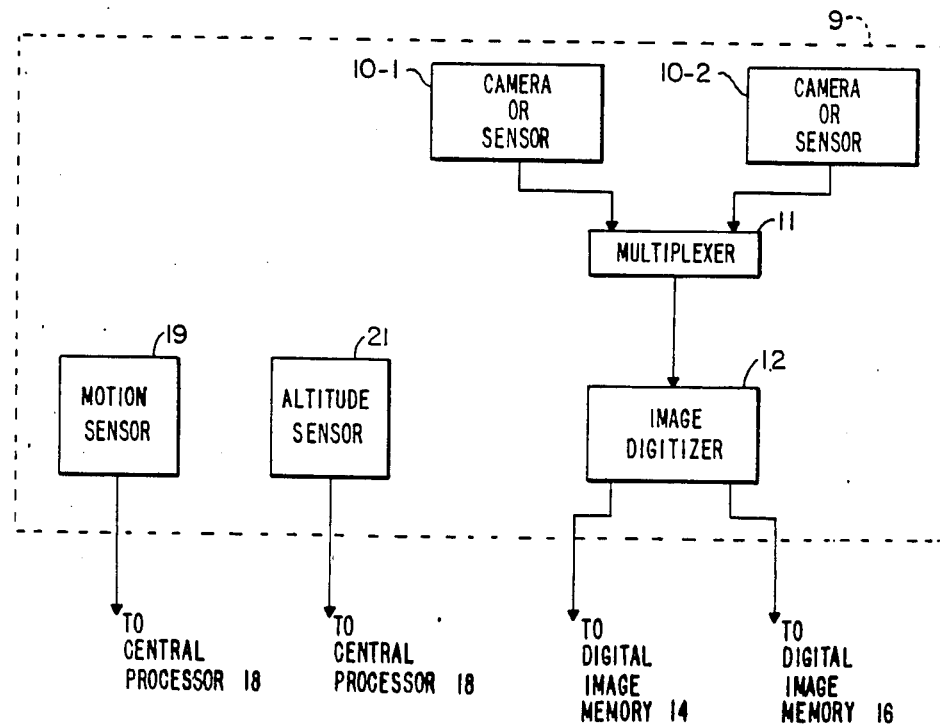

The camera 10 may comprise any type of imaging device, for example, a radar system, infrared viewer, or television camera. Image digitizer 12 may be any commercial digitization system, for example, a Quantex Image Digitizer, which converts the image, or analog signal from camera 10 to a digital data stream in which each portion of the image frame, or "pixel", is assigned to corresponding intensity value. In some embodiments, the present invention may include motion sensors 19, such as an inertial guidance system or other inertial platform, and an altitude sensor 21, such as an altimeter, both as shown in FIGS. 3A and 3B. Processor 18 may comprise any general purpose processor for executing the described algorithms on the digital image stream in real time during vehicle operation.

Figure 2A:
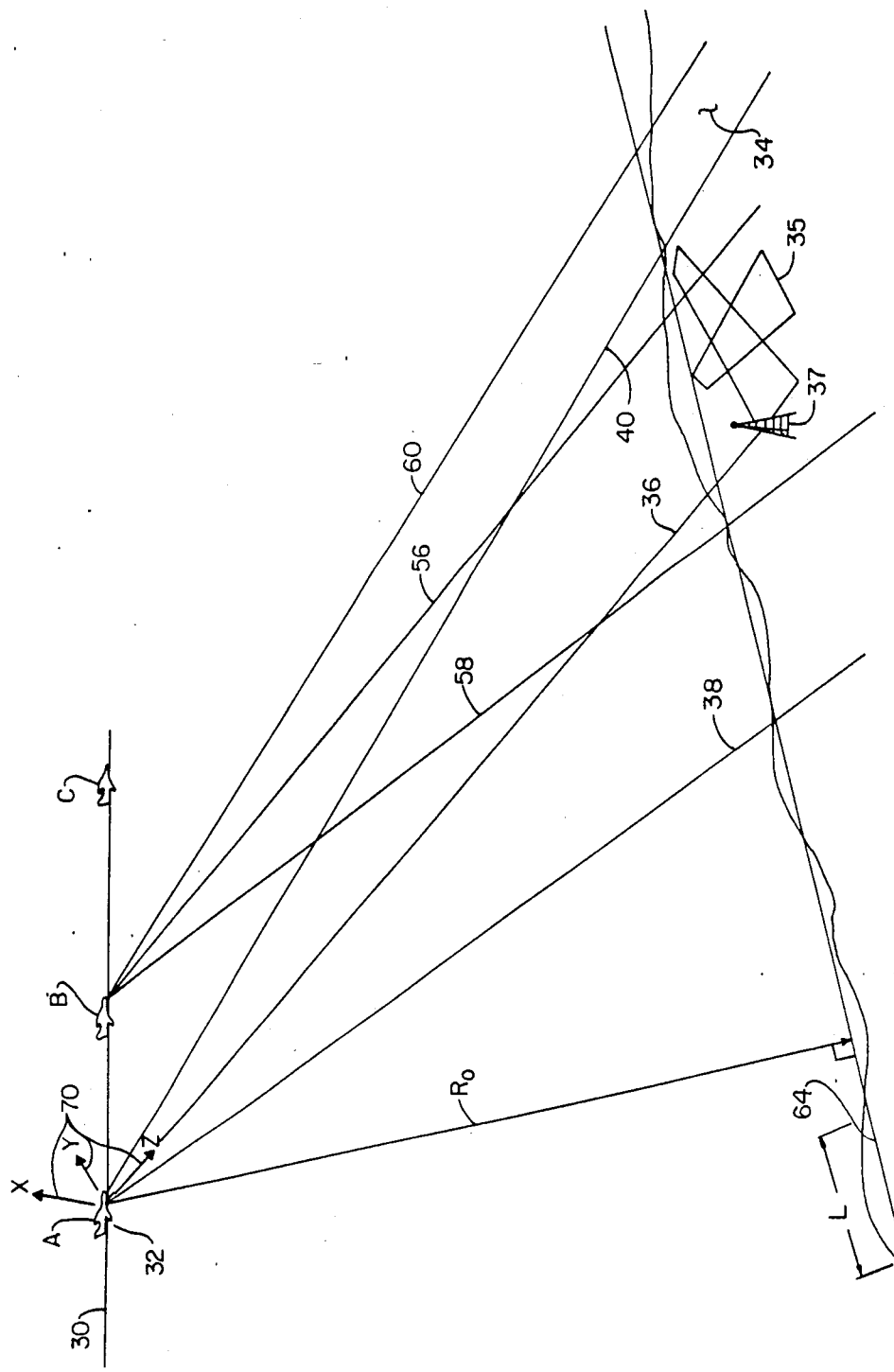
FIG. 2A shows in side view the flight path of and successive positions A and B of an aircraft using the device and method of the present invention.

The device of the present invention operates on stereo image pairs taken by camera 10 to derive the desired information. Thus, it is understood that the requisite stereo image pairs might be derived from successive images taken by the same camera taken from the platform of the device as it moves (as shown in FIGS. 1 and 2A), or by two cameras spatially separated on the host vehicle, for example on opposite wing tips of an aircraft or other vehicle (as shown in FIGS. 3A and 3B).

Vehicles which may utilize the range mapping device of the present invention include remotely piloted aircraft or ground vehicles, or low-flying aircraft or terrain following vehicles. If necessary, a second processor (not shown) may be used to access and compile the range information 20 calculated by processor 18 in a more useful format. In one example, this format may comprise a simple range map of the upcoming scene terrain. In a second example, such information 20 may comprise terrain following and collision avoidance data coupled to the guidance system of the host vehicle 32.

The geometrical differences (misregistration) between two different views [image(1) and image(2)] of a common object scene can be expressd as an image-to-image focal plane transformation:

$$X = X(x,y); \text{ and} \quad (1)$$

$$Y = Y(x,y); \quad (2)$$

where (X,Y) and (x,y) are the focal plane pixel coordinates in two successive overlapping images 99 and 100 of an object point in the scene of interest 34.

Figure 2B:
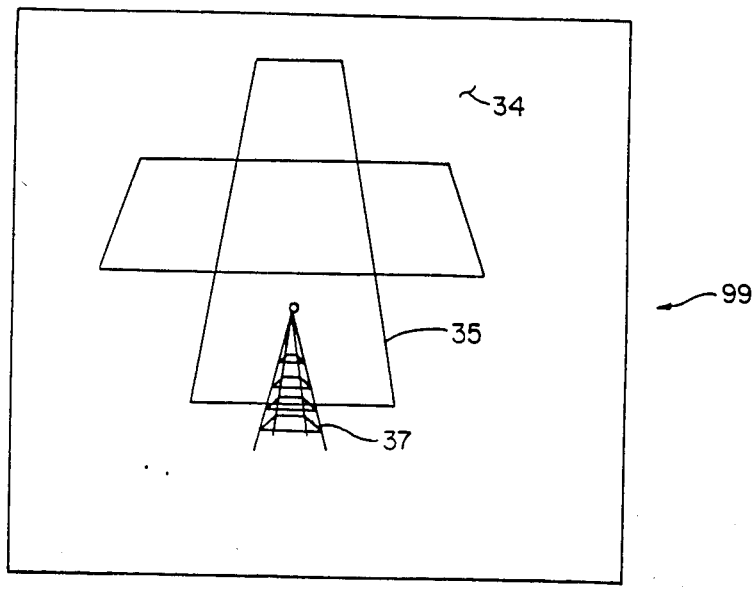
FIGS. 2B and 2C show the sensor images created by the device and method of the present invention at positions A and B, respectively.
Figure 2C:
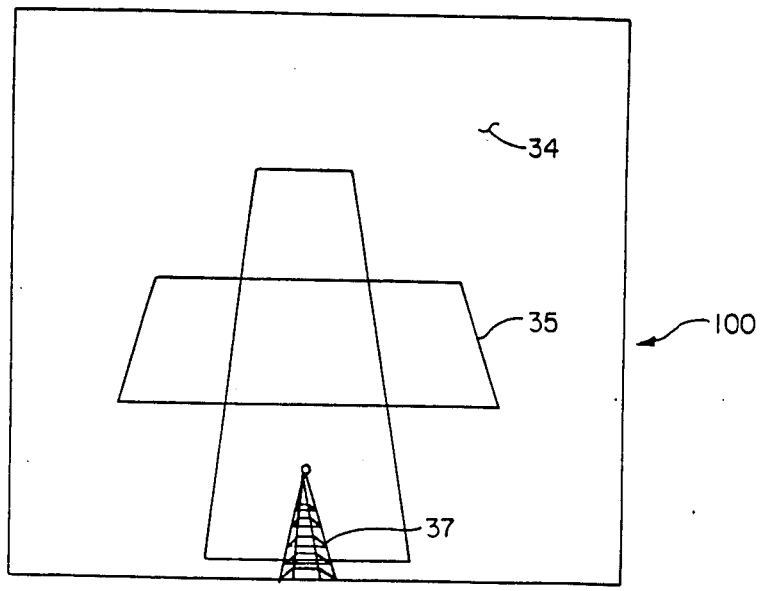

This transformation, once it has been determined, can be used to register the two images. For example, let the image functions f(x,y), g(x,y) represent the two different views of scene 34 as shown in FIGS. 2A, 2B and 2C. Then the image function h(x,y), where $$h(x,y) = g(X,Y), \quad (3)$$

represents a frame-wrapped version of image 100 which is registered with image 99. That is:

$$h(x,y) \equiv f(x,y)$$

where the ≡ sign means correspondence of object scene detail.

The correspondence will not generally extend over the full area of the image frame. For some values of (x,y), the object detail appearing in image 99 will not exist in image 100. That is, the point (X,Y), given by Equations (1) and (2), may lie outside the frame of image 100, or the corresponding object point may be hidden in image 100 by the parallax effects of a three-dimensional object scene.

The focal plane transformation, Equations (1) and (2), may be derived by projective analysis for the case of a two-dimensional (co-planar) object scene. A description of this derivation is included in J. Merchant, "Exact Area Registration of Different Views of A Common Object Scene," Opt. Eng. Vol. 20 No. 3, May/June 1981.

This address modification transformation which will transform the image 99, f(x,y), to register with image 100, g(x,y), of common scene 34 is:

$$X = \frac{A_1 x + A_2 y + A_3}{A_7 x + A_8 y + 1}; \text{ and} \quad (4)$$

$$Y = \frac{A_4 x + A_5 y + A_6}{A_7 x + A_8 y + 1}; \quad (5)$$

where the coefficients $A_1$ through $A_8$ are initially unknown and must be determined to complete the transformation process. Intuitively, these coefficients of the transformation may be visualized as follows: $A_1$ and $A_5$ define the magnification between views of the pixel image in x and y directions, respectively; $A_2$ and $A_4$ define the degree of rotation of the pixel image in the x and y directions, respectively; $A_3$ and $A_6$ define the linear shift in the x and y pixel locations; and $A_7$ and $A_8$ define the horizontal and vertical "keystone" effects, respectively, i.e., the object foreshortening normally associated with perspective views created by a camera image.

For convenience in processing, Equations (4) and (5) may be expressed in alternative notations in matrix form as Equations (6) and (7), respectively, as follows:

$$X = \frac{(a_{1,1})x + (a_{1,2})y + (a_{1,3})}{(a_{3,1})x + (a_{3,2})y + (a_{3,3})}; \text{ and} \quad (6)$$

$$Y = \frac{(a_{2,1})x + (a_{2,2})y + (a_{2,3})}{(a_{3,1})x + (a_{3,2})y + (a_{3,3})}. \quad (7)$$

where coefficients $A_1$ through $A_8$, in Equations (4) and (5), appear in matrix notation in Equations (6) and (7), that is, $A_1$ equals $a_{1,1}$, $A_2$ equals $a_{1,2}$ and so on until $A_8$ equals $a_{3,2}$ and $a_{3,3}$ equals 1.

Referring to FIGS. 2A, 2B and 2C, the flight path 30 of vehicle 32 carrying the present invention is shown. Two vehicle positions, A and B, are shown at which images 99 and 100, respectively, of terrain scene 34 are taken by the camera 10 of the present invention which is mounted on vehicle 32. The extent of the field of view of camera 10 about its line-of-sight 36 in position A is defined by lines 38 and 40, and by lines 58 and 60 about line-of-sight 56 in position B. FIGS. 2B and 2C show images 99 and 100, including typical scene detail 35 and 37 taken at positions A and B, respectively.

The median plane 64 through terrain scene 34 is defined by distance R measured perpendicular to plane 64 and a direction cosine matrix $L_j$ defined by the scene normal and angular relationship of range R to initial camera axis coordinate system 70. Camera axis system 70 is shown in FIG. 2A. Directions x, y and z are orthogonal, and describe the arbitrary axis system assigned to the initial position of camera 10. For the purpose of illustration, axis z is shown to correspond with the line of sight 36 of camera 10, axis y is shown substantially parallel to the scene 34, and axis x is shown perpendicular to both y and z in a substantially vertical direction. In the orientation shown, the x and z directions also describe the directions of cartesian coordinate system (x, y) in images taken by camera 10, such as images 99 and 100.

Referring to FIGS. 2A, 2B and 2C, as derived by Merchant in the article referenced above, the values of the "a" address modification coefficients are a function of the change of position of the camera 10 with respect to the scene 34 as represented by the following formula:

$$\frac{a_{i,j}}{a_{3,3}} = \frac{l_{i,j} - v_i L_j/R}{l_{3,3} - v_3 L_3/R}; \tag{8}$$

where in matrix notation i,j=1,2,3 and $v_i$ is the vector displacement of camera 10 between positions A and B, $L_j$ are the direction cosines of the median plane through scene 34 as seen from camera 10, $l_{i,j}$ are the direction cosines of the rotation of camera 10 between positions A and B, and $R_o$ is the initial minimum range from camera 10 to the median plane 64 of the scene. Assuming position A is the starting position of camera 10, R would be equal to $R_o$ as shown in FIG. 2A.

In a second embodiment, shown in FIGS. 3A and 3B, two cameras are spatially displaced on the same host vehicle. The camera displacement vector $v_i$ would then equal the known displacement between the two cameras and the camera rotation matrix $l_{i,j}$ would equal the relative rotation of the two cameras with respect to their line of sight.

For the apparatus and method of the present invention to be able to bring the two different images of the scene into exact area registration, the unknown component of the address transformation must be within the pull-in range of the algorithm. The images will generally be within the pull-in range when there is a significant overlap of scene content when the images are superimposed. Thus, the algorithm works most reliably when the camera or sensor is moved only a small amount between images, or when two sensors look simultaneously at the same scene from different positions. However, to accurately determine range a relatively long baseline (i.e., distance between camera positions) is required. This problem is solved in one embodiment by repeated application of the transformation coefficient determination algorithm to a series of successive sensor images where the sensor displacement between images is small, but the displacement between the first and last images in the sequence is large, thus creating a long baseline.

The choice of a one or two sensor system depends on the scene content, the viewing angle relative to the scene, and vehicle size and speed. The highest range accuracy is obtained from an image pair which displays the maximum viewing effect but which may still be registered by the device. Thus, the sensor configuration is selected to maximize viewing effect within the system tolerances.

As an example, a single camera on an aircraft may produce desirable image pairs when used in a side-looking or down-looking mode. In those applications in which it is desired to provide terrain following capability, a forward looking sensor configuration may be required. In that case, it may be desirable to use two sensors, one placed on each wing tip to give maximum displacement.

B. Range Mapping Through Pixel Address Transformation

In one embodiment, the device and method of the present invention uses successive "global" and "local" application of the address modification transformations of Equations (4) and (5) in order to derive the desired range or terrain information. First, a "global" transformation process is performed which, in the case of a three-dimensional scene, will crudely register the selected images.

In the "global" transformation process, the initial values of the "a" parameters which describe the change in viewing position of camera 10 between the selected images are estimated, either by information obtained from on board motion sensors 19 or by selection of nominal values of zero (0) for all the "a" parameters, except for $a_{1,1}$ and $a_{2,2}$ which are set to one (1). These starting "a" parameters are applied to the new image g(x,y), producing a "warped" image h(x,y) as described in Equation (3).

Next, the eight (8) parameters of the scene difference vector (V) are calculated which quantify the difference gradient between the two unwarped images f(x,y) and g(x,y), as follows:

$$V_1 = \int\int [f(x,y) - g(x,y)] \frac{\partial f}{\partial x} x\, dxdy; \tag{9}$$

$$V_2 = \frac{h}{w} \int\int [f(x,y) - g(x,y)] \frac{\partial f}{\partial x} y\, dxdy; \tag{10}$$

$$V_3 = h \int\int [f(x,y) - g(x,y)] \frac{\partial f}{\partial x} dxdy; \tag{11}$$

$$V_4 = \frac{w}{h} \int\int [f(x,y) - g(x,y)] \frac{\partial f}{\partial y} x\, dxdy; \tag{12}$$

$$V_5 = \int\int [f(x,y) - g(x,y)] \frac{\partial f}{\partial y} y\, dxdy; \tag{13}$$

$$V_6 = w \int\int [f(x,y) - g(x,y)] \frac{\partial f}{\partial y} dxdy; \tag{14}$$

$$V_7 = \frac{-1}{h} \int\int [f(x,y) - g(x,y)] \left(x^2 \frac{\partial f}{\partial x} + xy \frac{\partial f}{\partial y}\right) dxdy; \text{ and} \tag{15}$$

$$V_8 = \frac{-1}{w} \int\int [f(x,y) - g(x,y)] \left(xy \frac{\partial f}{\partial x} + y^2 \frac{\partial f}{\partial y}\right) dxdy; \tag{16}$$

where h and w are half the image height and width (in pixels), respectively.

The incremental changes in the address modification coefficients ($\delta A_i$) are then calculated as a function of the scene difference vectors, Equations (9) through (16); as follows $$\delta A_k = V_n \cdot [M_{k,n}]^{-1}; \tag{17}$$

where k and n vary from 1 to 8, and new address modification coefficients ($A_{(new)}$) are calculated as follows:

$$A_k(\text{new}) = A_k + \delta A_k. \tag{18}$$

This process is repeated until $\delta A_k$ reaches a minimum, from which it may be inferred that coefficients have been found which produce a warp h(x,y) of image g(x,y) which has minimal difference in scene content from image f(x,y).

The $M_{k,n}$ matrix can be found by computing the scene difference vector ($V_n$) as described by Equations (9) through (16), except that an autocorrelation is performed in each instance rather than a cross-correlation. That is, instead of calculation of the difference between pixel intensities in the two images f(x,y) and g(x,y), the following function ($\delta X \cdot \partial f/\partial x + \delta Y \cdot \partial f/\partial y$) is substituted, where $\delta X$ and $\delta Y$ are differential changes applied in a sequence as described in the above-referenced article at pages 435 and 436.

At this point, any residual misregistration between f(x,y) and g(x,y) are the result of missing scene detail resulting from scene parallax and/or local variations in scene height above the median plane 64 defined by initial range $R_o$ and the direction cosine vector $L_j$ of the scene plane normal. Assuming minimal parallax error between images 99 and 100, local height variation function r(x,y) about the median plane may be determined by "local" transformation of the image, thus creating a complete and corrected range map of the scene of interest. The corrected, "localized" address modification algorithm would then substantially register f(x,y) and g(x,y) so that:

$$f(x,y) = g\{X[R_o + r(x,y)], Y[R_o + r(x,y)]\} \quad (19)$$

which may be approximated by $$f(x,y) = g[X(R), Y(R)] + r(x,y) \cdot \left[ \frac{dg}{dx} \frac{dX}{dR} + \frac{dg}{dy} \frac{dY}{dR} \right]. \quad (20)$$

A correction $\delta r(x,y)$ can be found at each point (x,y) for the currently estimated local altitude function r(x,y):

$$\delta r(x,y) = \frac{f(x,y) - g\{X[R_o + r(x,y)], Y[R_o + r(x,y)]\}}{\frac{dg}{dx} \frac{dX}{dR} + \frac{dg}{dy} \frac{dY}{dR}}. \quad (21)$$

This correction can be applied to derive an improved measure $r(x,y)_{new}$ of the altitude profile of the scene relative to the median plane, as follows:

$$r(x,y)_{new} = r(x,y) + \delta r(x,y). \quad (22)$$

The use of this improved estimate $r(x,y)_{new}$ of the local altitude in the text iteration will result in improved registration, and thus a more accurate altitude function (r) value. That is, the process described above will cause the function r(x,y) to converge to the true altitude function over the set of iterations, from which a terrain or range map may be derived.

Figure 4A:
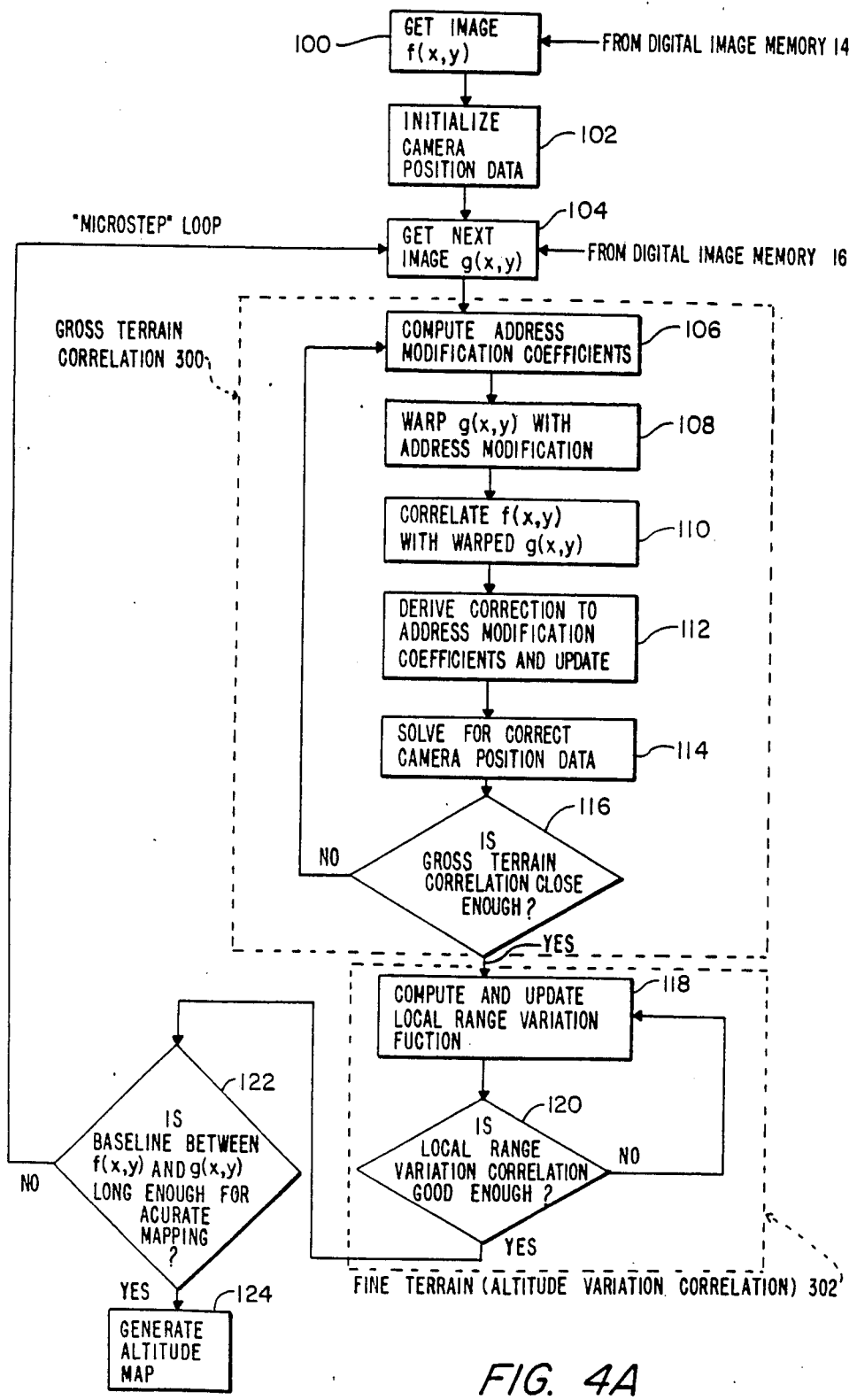
FIGS. 4A, 4B, 4C, 4D, 4E and 4F show a flow diagram of the "local frame warping" passive mapping method of the present invention.

Fig. 4A shows, in flowchart form, the general method of passive ranging of the present invention. In FIG. 4A a single moving sensor 10 (for example, mounted on an aircraft 32) takes a closely spaced sequence of frames or images along its flight path 30. In this case, the baseline is the displacement of sensor 10 between the points A and B where each of two successive frames are taken. The first frame f(x,y) (image 99) is obtained (step 100) by the processor, the starting camera positions are initialized (step 102) and the next frame g(x,y) (image 100) is obtained for comparison.

Frames f(x,y) and g(x,y) are then compared to derive a gross terrain correlation and then a fine terrain correlation, as described by the processing steps in blocks 300 and 302, respectively. If images f(x,y) and g(x,y) are closely spaced they will be easily registered. However, the stereo effect may not be strong enough to derive accurate range information.

The gross terrain address modification coefficients derived in step 112 and the fine terrain (or altitude variation) address modification coefficients derived in step 118 may then be used as initial conditions when comparing frame f(x,y) with the next frame g(x,y), for example, a new image (not shown) taken from position C along flight path 30. Thus, although the baseline between f(x,y) and the new g(x,y) is longer, the registration will still be easy because of the use of the previous coefficients as an initial condition. This technique, described above as "micro-stepping," is continued until a baseline is obtained from which accurate range information or a map, may be derived, as shown by steps 122 and 124.

Figure 4B:
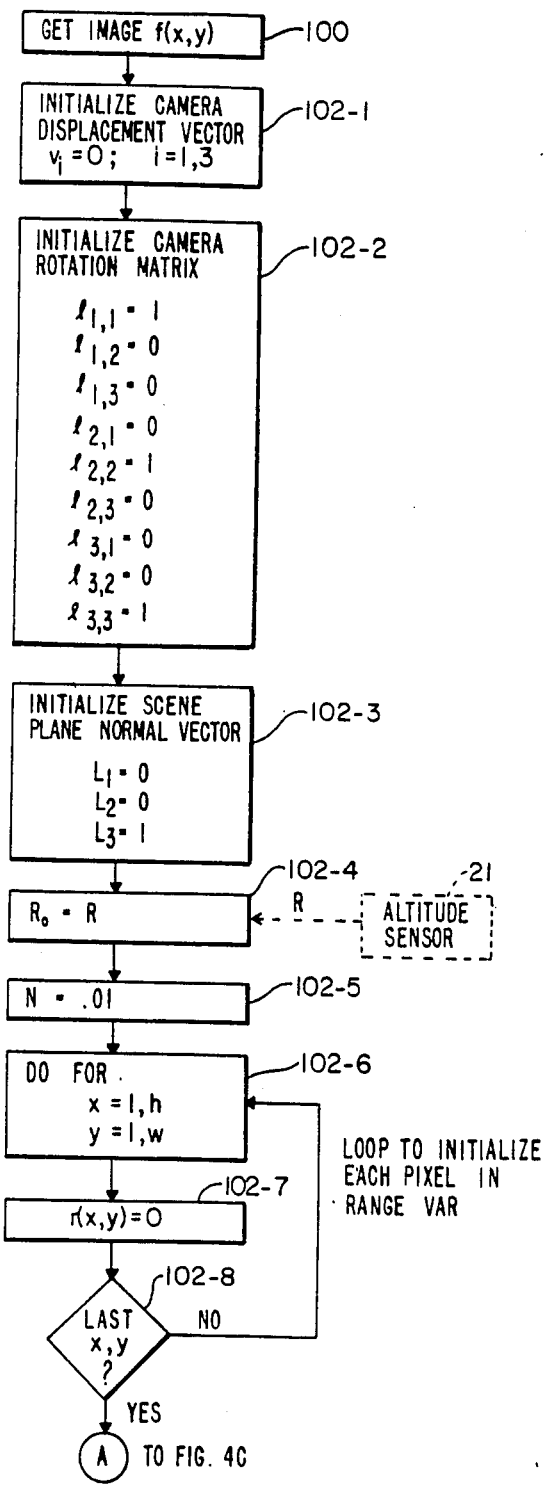
Figure 4C:
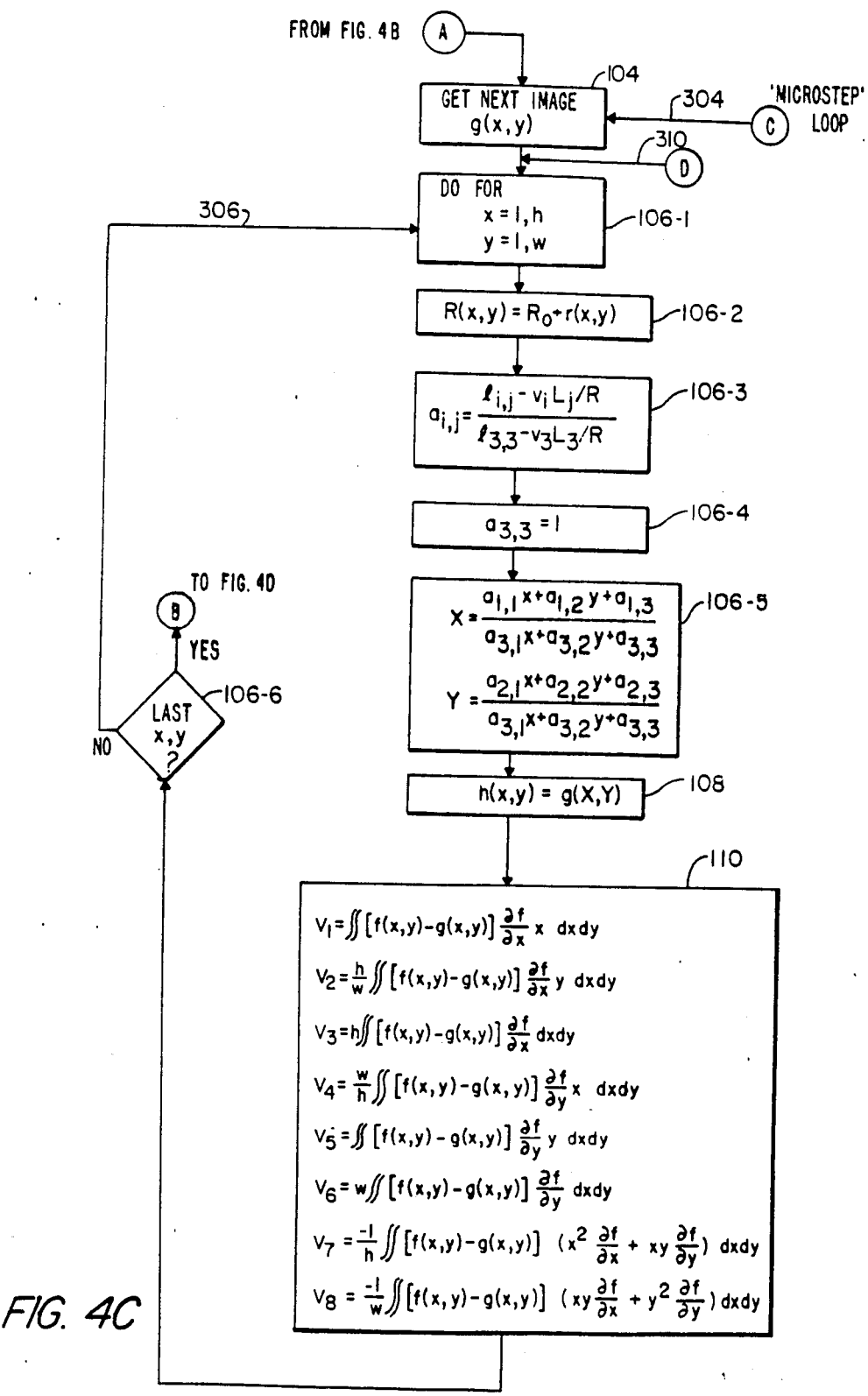
Figure 4D:
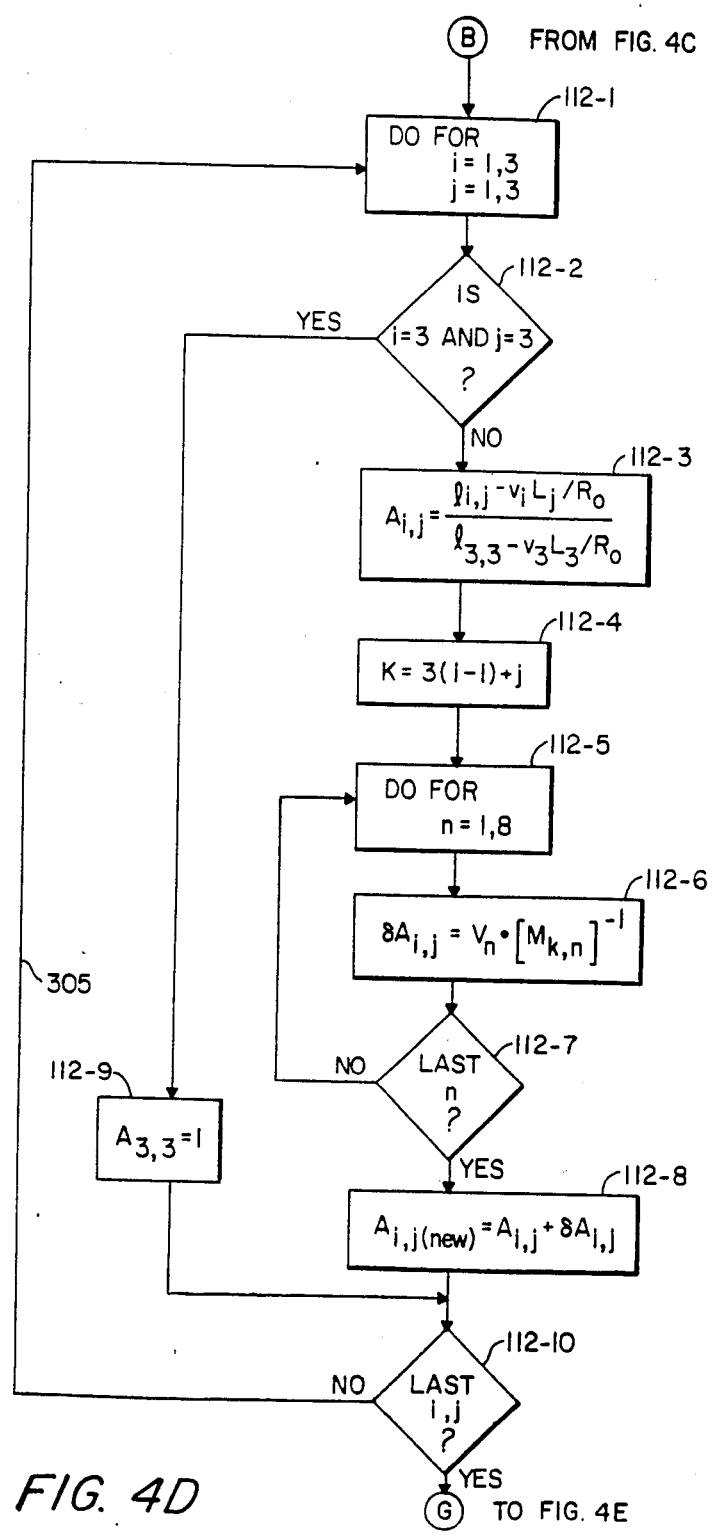
Figure 4E:
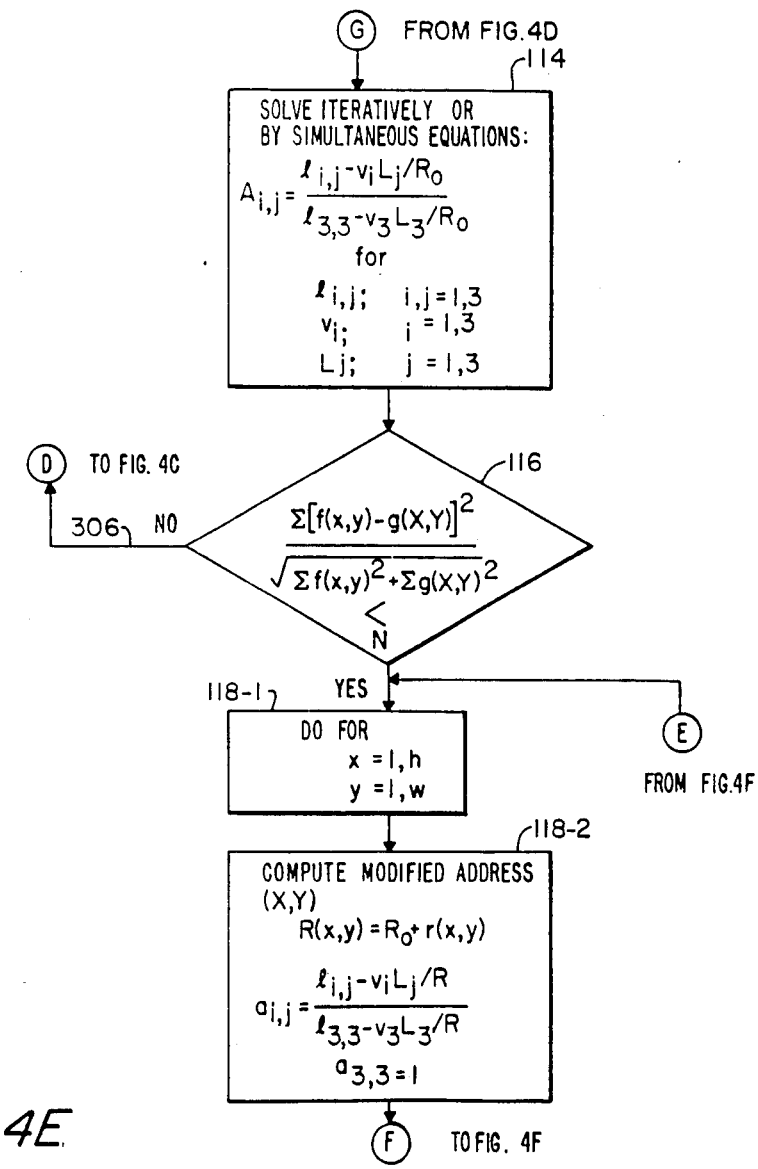
Figure 4F:
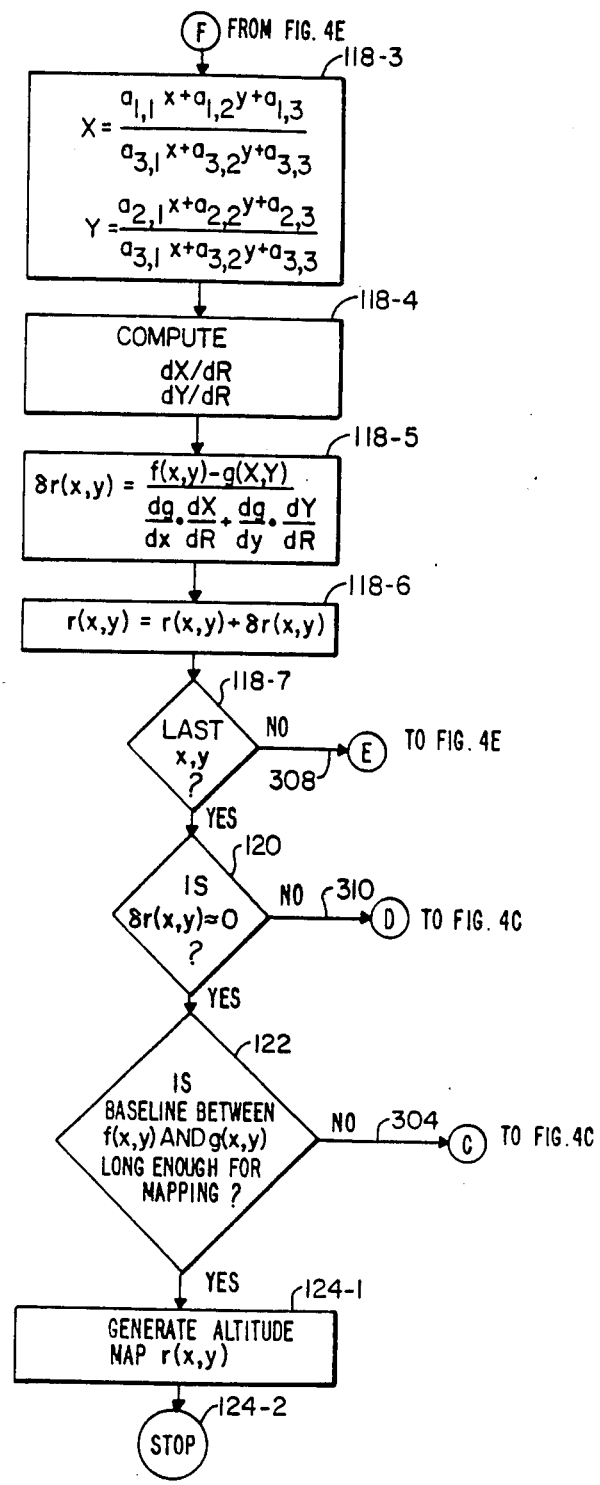

FIGS. 4B, 4C, 4D and 4E show in greater detail the method of passive ranging of the present invention. Referring to FIG. 4B, the first digitized frame f(x,y) becomes available to the processor in step 100. Certain parameters are then initialized. The camera displacement vector ($v_i$) relative to frame f(x,y) are set to zero in step 102-1. The direction cosine matrix of the camera rotation ($l_{i,j}$) relative to frame f(x,y) is set to the identity matrix (zero rotation) in step 102-2. The estimated tilt of the terrain relative to camera axes, or the scene plane normal ($L_j$), is initialized in step 102-3. The range R is set to the estimated altitude $R_o$ of the aircraft in step 102-4. The threshold correlation number N (selected in accordance with the expected scene content) is set in step 102-5. For most scenes, correlation number N of 0.01 is sufficient. The r(x,y) array, which is used to hold the altitude of every pixel (x,y) in frame f(x,y), is set to zero in steps 102-6, 102-7 and 102-8. The next digitized image g(x,y) is then obtained, as shown in step 104. This is the first image in the "micro-step" loop 304.

The first and Nth frames (f(x,y) and g(x,y)) are then processed by taking each pixel (x,y) in turn. In step 106 (see FIGS. 4A and 4C), the address modification coefficients are calculated as a function of (x,y). By step 106-2, computation of the distance (R(x,y)) along the vector direction ($L_j$) from the sensor to the pixel (x,y) as the sum of the median plane distance ($R_o$) and the local altitude variation (r(x,y)) is accomplished.

The local address modification parameters ($a_{i,j}$) are then calculated in step 106-3 as functions of the global displacement parameters $l_{i,j}$, $v_i$ and $L_j$. These are then used to calculate a modified address (X,Y) for each pixel (x,y) in step 106-5. This warped address is used in step 108 to warp g(x,y) into the form h(x,y) = g(X,Y), which is intended to be in registration with f(x,y).

The accuracy of this registration is assessed in step 110 where the image f(x,y) and the warped image g(X,Y) are correlated. The result (averaged over all pixels) will be $dA_{i,j}$ as shown in step 112-8. The steps 106 through 110 are repeated for all pixels in the frame by loop 306 connecting steps 106-6 and 106-1, as shown.

In step 110-1 the scene difference vector ($V_n$) is calculated as shown. In steps 112-1 through 112-6 the incremental corrections ($\delta A_{i,j}$) to the address modification coefficients ($A_{i,j}$) are calculated. In step 112-3 the starting values of the address modification coefficients ($A_{i,j}$) are calculated.

The distinction between the local parameters ($a_{i,j}$) and the global parameters ($A_{i,j}$) is that the local parameters are a function of (x,y) and the global parameters are not. The global parameters are an approximation for the purpose of computing an update to the camera displacement parameters ($v_i$) and ($l_{i,j}$). The global parameters ($A_{i,j}$) are computed from the current values of ($v_i/R_o$) and ($l_{i,j}$), as shown in step 112-3.

Step 112-4 calculates a one-dimensional integer subscript (k) equivalent to the two-dimensional subscript (i,j) of the address modification coefficients. That is, when (i,j) equals (1,1), (1,2), (1,3), (2,1) . . . (3,2), k will equal 1, 2, 3, 4 . . . 8.

In steps 112-5 through 112-7 the incremental corrections ($\delta A_{i,j}$) to the address modification coefficients ($A_{i,j}$) are calculated by matrix multiplication of the scene difference vector $V_n$ by the 8×8 inverse matrix $[M_{n,k}]^{-1}$. This $M_{n,k}$ matrix is calculated as described above. In step 112-8 a new set of address modification coefficients, $A_{i,j(new)}$, is calculated by applying the corrections ($\delta A_{i,j}$) to the starting values of $A_{i,j}$.

Step 112-2 checks to determine whether the last values of i and j are to be used for the address modification calculations in steps 112-3 through 112-8. Since the scene geometry always defines the $A_{3,3}$ value to be one, if the values of i and j are both three (3), processing will continue through step 112-9 to step 112-10. If all values of i and j have not been processed, processing returns via loop 305 to step 112-1. Otherwise, the updated values of $A_{i,j}$ are then used to compute updated values of the displacement parameters $v_i$, $l_{i,j}$ and $L_j$ as shown in step 114.

If the change $dA_{i,j}$ in $A_{i,j}$ that has just been computed is smaller than N, the gross terrain correction is not likely to be significantly improved. The process then moves to step 118. If not, it jumps back to step 106-1 via loop 306 and executes another pass over the image f(x,y).

In step 118-1, a processing loop is initiated over all pixels in the image f(x,y) in order to register the fine terrain structure of the two images f(x,y) and g(x,y). The modified address (X,Y) is then computed in steps 118-2 and 118-3 in the same manner as in step 106. The value of (X,Y) is a function of range (R), as shown in step 118-2. In step 118-4 the values of dX/dR, dY/dR are computed for each pixel (x,y). In step 118-5 a correction (dr(x,y)) to the local altitude variation (r(x,y)) is computed. Step 118-6 is used to update the altitude variation function (r(x,y)). If all pixels (x,y) have not been processed, the process continues via loop 308 to step 118-1.

When all pixels have been processed, the current change (dr(x,y)) in r(x,y) is analyzed in step 120 to determine if the value of r(x,y) has reached its limiting value so that no further change is likely to occur. If further change is possible, the process jumps back to step 106-1 via loop 310 and the processing over all pixels is repeated for fine terrain registration.

If not, a test is made in step 122 to see if the current baseline between image f(x,y) and image g(x,y) is adequate for the required accuracy of passive ranging. If not, the action jumps back to step 104 via loop 304 to get the next image in the micro-step sequence. Otherwise, the process terminates at this point when an altitude map $R(x,y) = R_o + r(x,y)$, already computed, is put out in the appropriate format, as shown in steps 124-1 and 124-2.

C. RANGE MAPPING THROUGH "RANGE SLICING"

In another embodiment, the device and method of the present invention uses a "range slicing" technique in order to ascertain the distance between camera 10 and detail in the scene of interest, thereby creating a range map of the scene.

For a first frame f(x,y), for example image 99, the following information is known: the direction cosines vector ($L_j$) of the scene plane normal, the distance between the camera and the average scene plane (range "R"), the camera rotation matrix ($l_{i,j}$), and the camera translation vector ($v_i$).

Thus, for any stereo image of the same scene area taken by camera 10, for example image 100 shown in FIG. 2C, the position of each scene detail pixedl (X,Y) of the new image may be related to a given pixel (x,y) of the reference image, by the following address transformations:

$$X = \frac{(a_{1,1})x + (a_{1,2})y + (a_{1,3})}{(a_{3,1})x + (a_{3,2})y + (a_{3,3})} \text{ ; and} \quad (23)$$

$$Y = \frac{(a_{2,1})x + (a_{2,2})y + (a_{2,3})}{(a_{3,1})x + (a_{3,2})y + (a_{3,3})} . \quad (24)$$

where the coefficients $a_{i,j}$ of the transformation equations are calculated as follows:

$$a_{i,j} = l_{i,j} - \frac{v_i L_j}{R} \text{ for } i,j = 1,3. \quad (25)$$

For the second image (and each subsequent stereo image) the camera rotation matrix ($l_{i,j}$) and camera translation matrix ($v_i$) will be known, for example, by position and motion sensors 19 also attached to the platform carrying the present invention. The values of the direction cosine matrix ($L_j$) and range (R) are estimated, either using the last calculated values, or the nominal values of zero (0), zero (0), and one (1) for $L_1$, $L_2$ and $L_3$, respectively, and the aircraft 32 altitude (taken from altitude sensor 21) for R. The reference image is then warped using Equations (23) and (24), and the address modification coefficients are calculated using Equation (25). This warped image is then compared to the second image 100 by some correlation technique, for example, by subtraction.

If the direction cosine vector $L_j$ and the range R were chosen correctly and the scenes captured in both images were planar, the correlation will show complete match between images. However, where the scene is three-dimensional, as shown in FIG. 2A, only those portions of the new image which lie in the same plane as the scene plane defined by estimated values of $L_j$ and R will correlate. Thus, the distances to each of those pixels may be easily computed as a function of R and pixel location relative to the orientation of camera 10. In order to determine the distances to other pixels in the new image, a series of new range R values are chosen, each of which in combination with the appropriate scene plane orientation vector $L_j$ will define a "range slice" through the new image. For each "slice", the $a_{i,j}$ coefficients are calculated, and the transformation and correlation are performed. For each "slice", those pixels which correlate lie on the slice. The portions of the scene lying in each plane are thus determined. The accumulated information relating portions of the image with each range slice are an approximation to the continuous height distribution function with an accuracy of half the plane separation, i.e., a range-based topographic map.

Figure 5A:
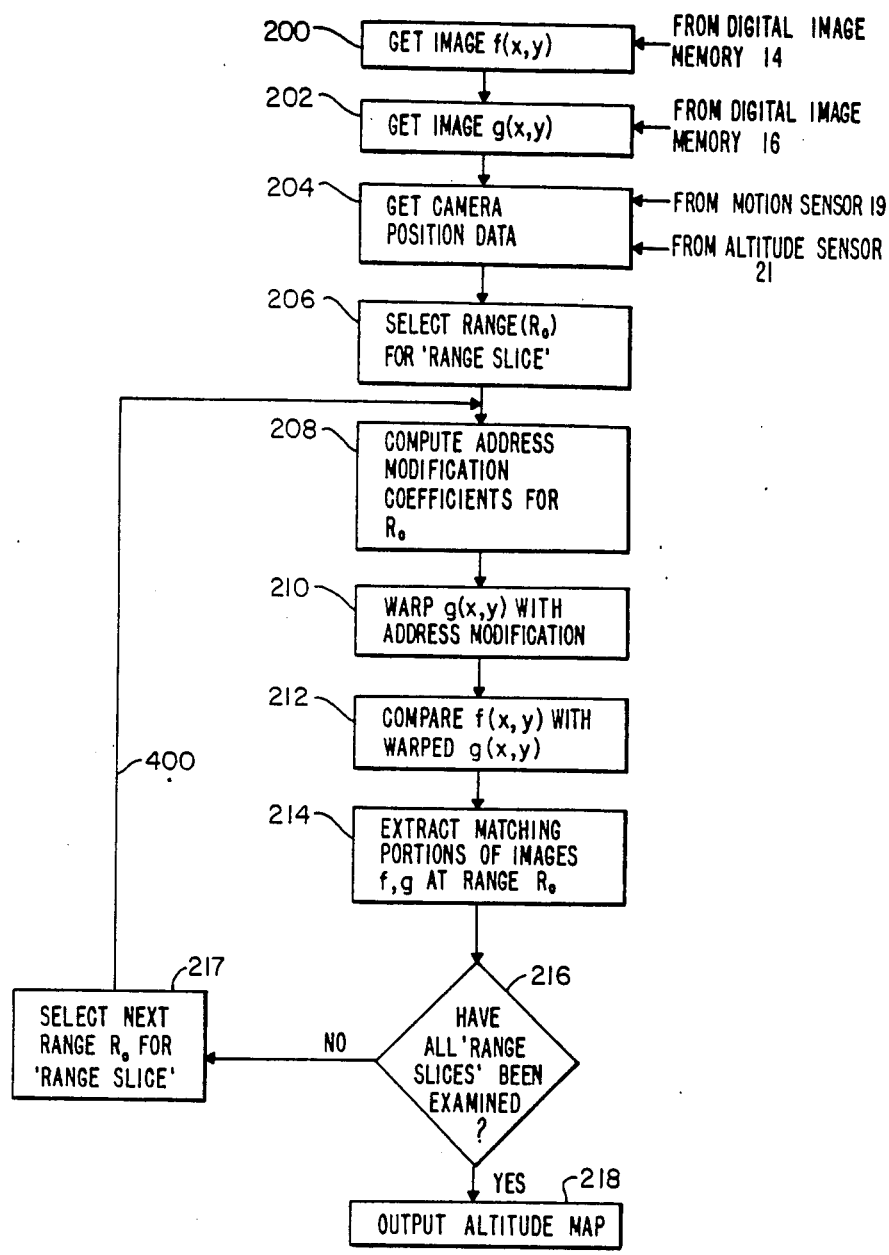
FIGS. 5A, 5B and 5C show a flow diagram of the "range slicing" passive mapping method of the present invention.
Figure 5B:
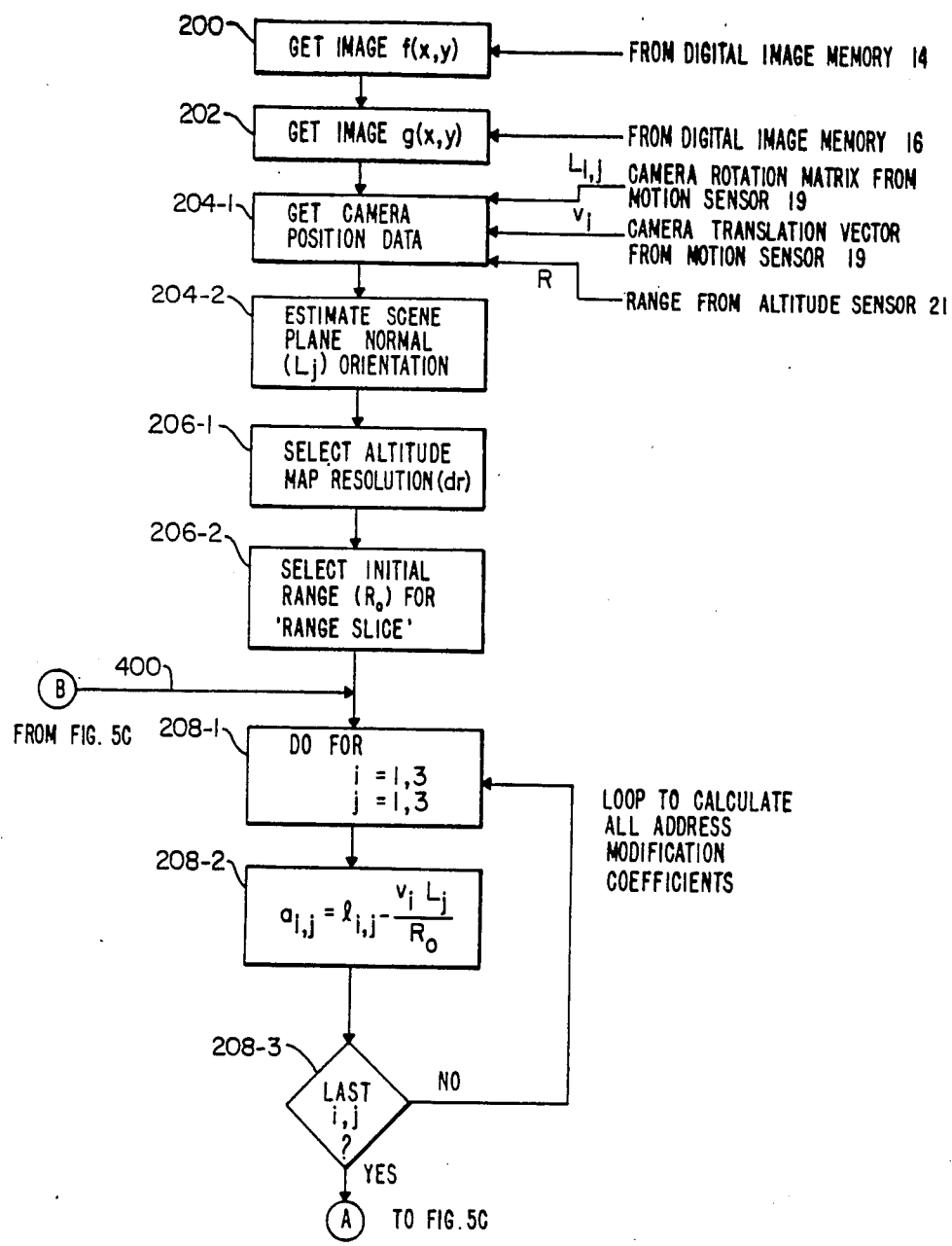
Figure 5C:
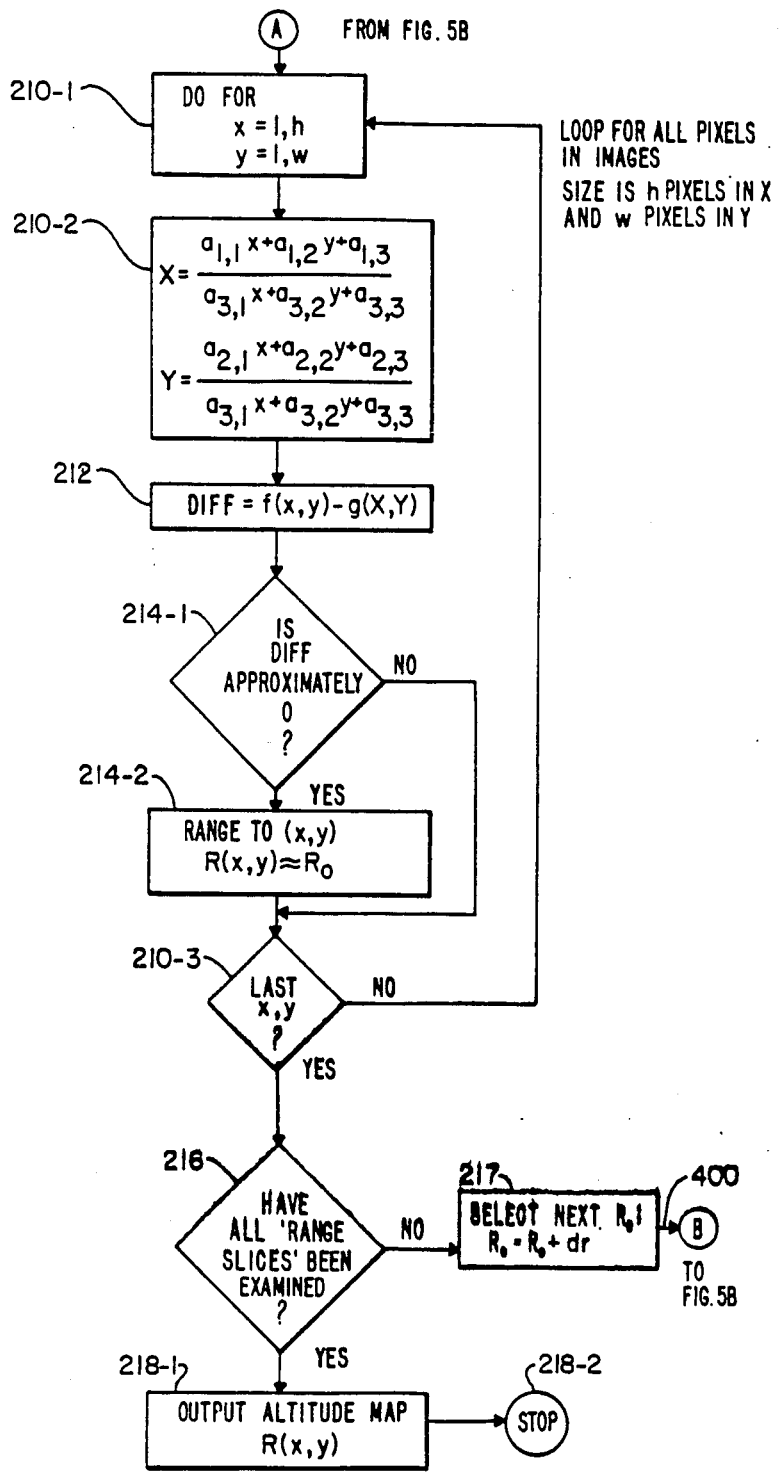

FIG. 5A shows a flowchart of the general method of passive ranging in this alternate embodiment. FIGS. 5B and 5C show the method in greater detail. The two stereo images f(x,y) and g(x,y) are obtained from digital image memories 14 and 16 in steps 200 and 202, respectively. Camera position data is obtained from altitude sensor 21 and motion sensor 19 in step 204. This includes the camera rotation matrix $l_{i,j}$, camera translation vector $v_i$ and range R. In step 204-2, the orientation of the scene plane normal $L_j$ is also estimated. Based on the scene topography and requirements, an altitude resolution dr is selected in step 206-1. An initial range $R_o$ is selected for the "range slice," as shown in step 206-2.

Steps 208, 210 and 212 comprise the method steps of computing the appropriate address modification coefficients for the range slice, warping image g(x,y) with the new address modification and comparing f(x,y) with the warped image g(X,Y), respectively. As shown in FIG. 5C, step 210 further comprises the steps of, for each pixel (x,y), calculating the address modification (X,Y) in step 210-2, and calculating the difference between f(x,y) and g(X,Y) in step 212.

Based on the comparison in step 214, the address (x,y) of all pixels in the two images that match are extracted and assigned a range value of $R_o$. In other words, those pixel locations having matching intensities are defined to lie on the range slice at a distance $R_o$ from camera 10. As shown in FIG. 5C, this process includes the steps of evaluating the difference in step 214-1 and then assigning the distance of the range slice $R_o$ to the range map function R(x,y) in step 214-2.

In step 216 it is determined whether all range "slices" have been examined. If they have not, a new value of $R_o$ is selected in step 217, and processing returns to step 208 via loop 400. Otherwise, the altitude map R(x,y) is generated in step 218-1.

Having described the invention, what is claimed as new and novel and for which it is desired to secure Letters Patent is:

1. A method for passively mapping a desired scene of interest from a first and a second image obtained from a first sensor viewing said scene from a first position and a second position, respectively, said first sensor having a predetermined axis system, said method comprising the method steps of:
   A. digitizing said first and second images of said desired scene, thereby creating first and second digitized images, respectively, of said desired scene, each of said digitized images having intensity information which are located at different addresses in a memory;
   B. determining the relative position of said first sensor between said first and second positions, respectively, said relative position described by information relating to the rotation of said first sensor about said axis system, the displacement of said first sensor relative to said axis system, and the direction of a normal to a first plane which is substantially coplanar with said scene, said direction measured relative to said axis system;
   C. selecting a first range distance along said normal for use in determining the portions of said first image which are positioned on a second plane which is parallel to said first plane substantially at said first range distance from said first sensor;
   D. modifying said memory addresses of said intensity information of said second image, thereby producing a first warped image to be used to compare said addresses of said first and second images which have substantially equal intensity information;
   E. comparing said first digitized image and said first warped image;
   F. extracting the portions of said first image which have a substantially equal intensity with respect to corresponding portions of said first warped image;
   G. assigning said first range distance to each of said extracted portions of said first image; and
   H. repeating said steps of selecting, modifying, comparing, extracting and assigning for ranges in addition to said first range until the maximum number of addresses having substantially equal intensity values are identified, said extracted image portions and range distances assigned thereto being used to provide a map of the scene of interest.

2. A method as in claim 1 further comprising the step of generating an altitude map of said scene for each of said extracted portions.

3. A method as in claim 1 wherein said mapping method utilizes a second sensor placed at said second position, wherein said first image is sensed by said first sensor placed at said first position, and wherein said second image is sensed by said second sensor.

4. A method for passively mapping a desired scene of interest from a first image and a second image obtained from a first sensor viewing said scene from a first position and a second position, respectively, said first sensor having a fixed axis system, said method comprising the method steps of:
   A. digitizing said first and second images of said desired scene, thereby creating first and second digitized images, respectively, of said desired scene, each of said digitized images comprised in an array of two dimensional pixel addresses (x,y), wherein an intensity value f(x,y) is associated with each of said pixel addresses (x,y) in said first image, and wherein an intensity value g(x,y) is associated with each of said pixel addresses (x,y) in said second image;
   B. determining the relative position of said first sensor between said first and second positions, said relative position described as follows:
      (i) a first matrix describing rotation of said first sensor about said axis system between said first and second positions of said sensor,
      (ii) a first vector describing the displacement of said first sensor relative to said axis system, said displacement measured between said first and second positions, and
      (iii) a second vector describing, relative to said axis system, a normal to a first plane which is substantially coplanar with said scene of interest;
   C. selecting a first range distance $R_o$ for use in determining which of said pixel addresses (x,y) in said first image are positioned substantially on a second parallel to said first plane, said second plane positioned at said range $R_o$ from said first sensor at said first position;
   D. computing address modification coefficients $a_{i,j}$ for said range $R_o$ in order to warp each pixel address (x,y) in said first image to a new pixel address (X,Y) in said second image, wherein said intensity value f(x,y) of said first image is substantially equal to the intensity value g(x,y) of said second image, said computation made in accordance with the following equation:

$$a_{i,j} = l_{i,j} - \frac{v_i L_j}{R_o}$$

wherein i and j have the values 1, 2 and 3, respectively, wherein $l_{i,j}$ is said first matrix, wherein $v_i$ is said first vector; and wherein $L_j$ is said second vector;
   E. warping said second digitized image with said address modification coefficients $a_{i,j}$ using the following address modification equations:

$$X = \frac{a_{1,1} + a_{1,2}y + a_{1,3}}{a_{3,1}x + a_{3,2}y + a_{3,3}} \text{; and}$$

-continued $$Y = \frac{a_{2,1}x + a_{2,2}y + a_{2,3}}{a_{3,1}x + a_{3,2}y + a_{3,3}},$$

thereby creating a first warped digitized image comprised in an array of two dimentional pixel addresses (X,Y) wherein an intensity value g(X,Y) is associated with each of said pixel addresses (X,Y) in said first warped digitized image;

F. comparing said first digitized image and said first warped digitized image;

G. extracting said pixel addresses (x,y) in said first digitized image which have said intensity value f(x,y) substantially equal to the intensity value g(X,Y);

H. assigning said first range distance $R_o$ to each of said extracted pixel addresses (x,y);

I. changing said range $R_o$ in order to obtain a new range distance $R_x$;

J. repeating said steps of selecting, computing, warping, comparing, extracting, assigning and incrementing for each new range distance $R_x$; and K. generating an altitude map of said scene in the form of a functional value R(x,y), wherein each of said pixel addresses (x,y) in said altitude map R(x,y) corresponds to said pixel addresses (x,y) in said first digitized image, and wherein the functional value R(x,y) is equal to the assigned range values $R_o$ and $R_x$ for each of said extracted pixel addresses (x,y).

5. A method as in claim 4 wherein said method for mapping a desired scene utilizes a second sensor placed at said second position, wherein said first image is sensed by said first sensor placed at said first position, and wherein said second image is sensed by said second sensor.

6. Apparatus for mapping a desired scene of interest from a first and a second image obtained from a first sensor viewing said scene from a first position and a second position, respectively, said first sensor having a predetermined axis system, said apparatus comprising:

A. means for digitizing said first and second images of said desired scene, thereby creating first and second digitized images, respectively, of said desired scene, each of said digitized images having intensity information which are located at different addresses in a memory;

B. means for determining the relative position of said first sensor between said first and second positions, respectively, said relative position described by information relating to the rotation of said first sensor about said axis system, the displacement of said first sensor relative to said axis system, and the direction of a normal, relative to said axis system, to a first plane which is substantially coplanar with said scene;

C. means for selecting a first range distance along said normal for use in determining the portions of said first image which are positioned on a second plane which is parallel to said first plane substantially at said first range distance from said first sensor;

D. means for modifying said memory addresses of said intensity information of said second image, thereby producing a first warped image to be used to compare said addresses of said first and second images which have substantially equal intensity information;

E. means for comparing said first digitized image and said first warped image;

F. means for extracting the portions of said first image which have a substantially equal intensity with respect to corresponding portions of said first image;

G. means for assigning said first range distance to each of said extracted portions of said first image;

H. means for enabling said means for determining, selecting, modifying, comparing, extracting and assigning in order to create a high resolution range function of said scene; and I. means for generating an altitude map of said scene for each of said extracted portions.

7. Apparatus for passively mapping a desired scene of interest from first and second images of said scene, said images sensed from first and second positions respectively, said apparatus comprising:

A. a first means for sensing, said first means for sensing producing said images of said scene of interest, said first sensor having a predetermined axis system;

B. means for producing a digital representation of said images thereby creating first and second digitized images of said first and second images respectively, each of said images comprised in an array of two dimensional pixel addresses (x,y);

C. means for determining the relative position of said first sensor between said first and second positions, said relative position described as follows:
  (i) a first matrix describing rotation of said first sensor about said axis system between said first and second positions,
  (ii) a first vector describing the displacement of said first sensor relative to said axis system, said displacement measured between said first and second positions, and
  (iii) a second vector describing, relative to said axis system, a normal to a first plane which is substantially coplanar with said scene of interest;

D. means for selecting a first range distance $R_o$ for use in determining which of said pixel addresses (x,y) in said first image are positioned substantially on a second plane parallel to said first plane, said second plane positioned at said range $R_o$ from said first sensor at said first position;

E. means for computing address modification coefficients $a_{i,j}$ for said range $R_o$ by the equation:

$$a_{i,j} = l_{i,j} - (v_i L_j / R_o),$$

wherein i and j have the values 1, 2 and 3, respectively, $l_{i,j}$ is said first matrix, $v_i$ is said first vector; and $L_j$ is said second vector;

F. means for warping said second digitized image with said address modification coefficients $a_{i,j}$ thereby creating a warped second digitized image comprising an array of two dimensional pixel addresses (X,Y) wherein an intensity value g(X,Y) is associated with each of said pixel addresses (X,Y) in said warped second digitized image;

G. means for comparing said first digitized image and said first warped image;

H. means for extracting said pixel addresses (x,y) in said first digitized image in which said intensity value f(x,y) of said first digitized image is substantially equivalent to the intensity value g(X,Y) of said first warped image;

I. means for producing a range function $R(x,y)$, wherein for each of said extracted pixel addresses $(x,y)$ the value of the function $R(x,y)$ is set to said range $R_o$;

J. means for repeating said steps of selecting, computing, warping, comparing, extracting, assigning and incrementing for each new range distance Rhd x; and K. means for generating an altitude map of said scene in the form of a functional value $R(x,y)$, wherein each of said pixel addresses $(x,y)$ in said altitude map $R(x,y)$ corresponds to said pixel addresses $(x,y)$ in said first digitized image, and wherein the functional value $R(x,y)$ is equal to the assigned range values $R_o$ and $R_x$ for each of said extracted pixel addresses $(x,y)$.

8. Apparatus as in claim 7 further comprising means for enabling said means for determining, selecting, computing, comparing and extracting for a plurality of desired ranges $R_o$ in order to create a high resolution range function $R(x,y)$ of said scene.

9. Apparatus as in claim 7 wherein said first means for sensing is positioned at said first postion to sense said first image, and further comprising a second means for sensing positioned at said second position to sense said second image.

10. Apparatus as in claim 7 wherein said means for producing a digital representation of said images further comprises one or more means for storing said digital representations of said digital representations of said images.

11. Apparatus as in claim 7 wherein said means for determining relative position comprises:

A. an inertial motion sensor; and
B. an altimeter.

12. A method for determining a range from a passive sensor to points in a scene within the field of view of said sensor, comprising the steps:

A. forming one image of at least a portion of said scene from data acquired by a first passive sensor located at one location, said one image comprised of pixels, each pixel having an address locating said pixel in said scene;

B. forming another image of said portion of said scene from data acquired by a second passive sensor at another location removed from said one location, said another image comprised of pixels, each pixel having an address locating it in said another image;

C. calculating location addresses for pixels in said one image to locate said pixels in a first plane a first distance from said one location;

D. calculating a location address for pixels in said another image to locate said pixels in said first plane;

E. calculating an address for said pixels in said another image to warp said another image into registration with said one image;

F. correlating pixels of said one image and said another image at address locations obtained in steps, c, d, and e;

G. calculating a range to regions of said scene represented by pixels which correlate based on an assumption said regions lie in said first plane.

13. A method for determining a range from a passive sensor to points in a scene as in claim 12 wherein said first plane is a median plane through said scene.

* * * * *